(12) United States Patent
Van Der Brug

(10) Patent No.: US 10,231,316 B2
(45) Date of Patent: Mar. 12, 2019

(54) COMMUNICATION VIA A POWER WAVEFORM

(71) Applicant: PHILIPS LIGHTING HOLDING B.V., Eindhoven (NL)

(72) Inventor: Willem Peter Van Der Brug, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 191 days.

(21) Appl. No.: 14/763,631

(22) PCT Filed: Jan. 16, 2014

(86) PCT No.: PCT/IB2014/058326
§ 371 (c)(1),
(2) Date: Jul. 27, 2015

(87) PCT Pub. No.: WO2014/118665
PCT Pub. Date: Aug. 7, 2014

(65) Prior Publication Data
US 2015/0366038 A1 Dec. 17, 2015

Related U.S. Application Data

(60) Provisional application No. 61/759,467, filed on Feb. 1, 2013.

(51) Int. Cl.
*H05B 37/02* (2006.01)
*H04B 3/54* (2006.01)
*H04B 17/00* (2015.01)

(52) U.S. Cl.
CPC ........... *H05B 37/0263* (2013.01); *H04B 3/54* (2013.01); *H04B 3/542* (2013.01); *H04B 17/00* (2013.01); *H04B 2203/5458* (2013.01)

(58) Field of Classification Search
CPC ........... H02J 13/002; H04B 2203/5408; H04B 2203/5416; H04B 2203/542;
(Continued)

(56) References Cited

U.S. PATENT DOCUMENTS 5,491,463 A * 2/1996 Sargeant ................ H04B 3/542
340/12.37
2001/0008391 A1 7/2001 Yuasa
(Continued)

FOREIGN PATENT DOCUMENTS

DE 10128258 A1 12/2002
WO 2013061206 A2 5/2013

*Primary Examiner* — Seokjin Kim

(57) ABSTRACT

Methods of controlling an apparatus based on analysis of an input power waveform supplied to the apparatus. The methods may comprise demodulating a plurality of incoming data packets from the input power waveform. The methods may comprise determining whether N data packets of said plurality of incoming data packets are the same, wherein N is a positive integer having a dynamic value that depends on the input power waveform. The methods may comprise controlling at least one aspect of the apparatus based on said N data packets if said N data packets were determined to be the same. Also disclosed are apparatus corresponding to such methods.

15 Claims, 5 Drawing Sheets

(58) Field of Classification Search
CPC .... H04B 2203/5425; H04B 2203/5445; H04B 2203/545; H04B 2203/5458; H04B 2203/547; H04B 2203/5495; H04B 3/54; H04B 17/00; Y02B 90/2615; Y02B 90/2692; H04L 1/0045; H04L 1/06; H04L 1/08; H04L 12/08; H04L 12/42; H04L 2001/0095; H04L 25/0266; H04L 27/10; H04L 27/18; H04L 27/2601; H04L 27/34; H04L 5/023; H05B 37/0263; Y04S 40/121

See application file for complete search history.

(56) References Cited

U.S. PATENT DOCUMENTS

| | | | |
|---|---|---|---|
| 2003/0118042 A1* | 6/2003 | Nishida | H04L 1/0045 370/404 |
| 2003/0189495 A1* | 10/2003 | Pettler | H02J 13/002 340/854.3 |
| 2004/0153679 A1 | 8/2004 | Fitton | |
| 2004/0153940 A1 | 8/2004 | Yu | |
| 2006/0049693 A1* | 3/2006 | Abraham | H04L 27/34 307/10.1 |
| 2007/0222579 A1 | 9/2007 | Berkman | |
| 2008/0278295 A1 | 11/2008 | McKenzie | |

* cited by examiner

COMMUNICATION VIA A POWER WAVEFORM

CROSS-REFERENCE TO PRIOR APPLICATIONS

This application is the U.S. National Phase application under 35 U.S.C. § 371 of International Application No. PCT/IB2014/058326, filed on Jan. 16, 2014, which claims the benefit of U.S. Provisional Patent Application No. 61/759,467, filed on Feb. 1, 2013. These applications are hereby incorporated by reference herein.

TECHNICAL FIELD

The present invention is directed generally to control of an apparatus connected to a power line. More particularly, various inventive methods and apparatus disclosed herein relate to controlling an apparatus, such as a lighting fixture, based on analysis of an input power waveform supplied to the apparatus.

BACKGROUND

Apparatus such as lighting fixtures have been designed that are capable of receiving control signals for controlling one or more aspects thereof. For example, some lighting fixtures receive control signals that may at least selectively dictate the dimming levels of such lighting fixtures.

One existing solution for transmitting such control signals utilizes one or more stand-alone control wires that extend from a controller to the lighting fixtures. Data packets are then sent over the control wires to control the lighting fixtures. The data packets and communications may conform to a communications protocol such as DMX or DALI. Implementation of such a solution may have one or more drawbacks. For example, such a solution requires the running of one or more separate wires and involves limitations on wiring length and/or wiring method that may not be appropriate for certain applications such as street lighting.

Other existing solutions enable transmitting such control signals without installing new wires. Such solutions utilize wireless control signals or communications over the power wires (PLC). However, implementation of such solutions may have one or more drawbacks. For example, such solutions require specific hardware modems and/or radios to be installed at each individual lighting fixture. Such specific equipment is often overly costly and/or may not be easily installed in existing lighting fixtures or light poles supporting lighting fixtures.

Thus, there is a need in the art to provide methods and apparatus for controlling a lighting fixture utilizing a communication protocol transmitted over the power line that feeds the lighting fixture and that optionally does not require specific hardware modems be installed at the lighting fixture.

SUMMARY

Generally speaking the present disclosure concerns controlling an apparatus, such as a lighting fixture, via communication over the power line that feeds it, in a way that enables or at least permits a degree of error tolerance.

Error tolerance may be desirable since operation of various electrical loads connected to the power line can cause it to be a 'noisy' communications channel. The amount of noise in the power line will vary over the course of a typical day, as the various electrical loads connected thereto are switched on or off. Thus it may be advantageous to use an adaptive error detection/correction coding (ECC) scheme to provide the desired degree of error tolerance, i.e. a scheme in which the amount of transmitted redundancy (and consequently the error detection/correction performance) is varied in dependence on a current signal-to-noise ratio in the power line. However, it may be impractical or at least expensive to implement a conventional adaptive ECC scheme when the power line is arranged for unidirectional communication from a transmitter to one or more receivers, since such a scheme would require one or more 'back channels' from the receiver(s) to the transmitter. It would nevertheless be desirable to implement error-tolerant communication over the power line in a way that takes account of the current signal-to-noise ratio therein, e.g. so as to reduce the latency, when conditions in the power line permit it, between a command being transmitted and the command being implemented at the receiver(s).

Accordingly, in some embodiments disclosed herein an apparatus, such as a lighting fixture, is controlled based on data packet information obtained via an input power waveform provided thereto. Such an apparatus may be arranged to, inter alia, determine whether N incoming data packets are the same, N being a positive integer (greater than 1) which has a dynamic value that depends on the input power waveform. If the N incoming data packets are the same then the apparatus may be controlled in accordance with those data packets, e.g. by implementing a command represented by those data packets. So the latency associated with controlling the apparatus in accordance with a received data packet depends on the value of N, which in turn is dynamic and depends on one or more properties of the input power waveform. Thus said latency may be dependent on a noise-level in the input power waveform and/or on a type of data packet being carried by the input power waveform, for example.

Thus embodiments disclosed herein exploit the idea that, in order to achieve a degree of robustness to error, a variable latency between first receiving a data packet and the reacting to that data packet may be acceptable in some scenarios. For instance, if a new dimming level is transmitted to street lighting fixtures in a network, it may not matter whether the street lighting fixtures implement the new dimming level after 5 seconds or after 5 minutes.

In various embodiments, there is a method of controlling an apparatus based on analysis of an input power waveform supplied to the apparatus. The method may comprise demodulating a plurality of incoming data packets from the input power waveform, e.g. by comparing a voltage level of a plurality of sine cycle periods of said input power waveform in order to determining the plurality of incoming data packet based on which of said sine cycle periods have a reduced voltage level and which have a non-reduced voltage level. The method may comprise determining whether N data packets of said plurality of incoming data packets are the same, wherein N is a positive integer having a dynamic value that depends on the input power waveform and is at least 2. The method may comprise controlling at least one aspect of the apparatus based on said N data packets if said N data packets were determined to be the same; e.g. implementing a command if said N data packets all represent the command.

As used herein, the condition "N incoming data packets are the same" will be satisfied if, inter alia, the data packets in question are identical; an identical code word can be derived from all of the data packets in question; or all of the data packets are suitable for causing substantially the same effect on the apparatus.

The value of N may vary in response to a variation in one or more properties of the input power waveform.

In various embodiments, the value of N may depend on at least one of: a signal-to-noise level of the input power waveform; and which control command of a plurality of control commands is represented by a first packet of the plurality of incoming data packets.

The value of N may vary in response to a change in a signal to noise ratio of the input power waveform, e.g. a measured drop in noise-level in the input power waveform may correspond to an increase in the signal to noise ratio and, consequently, a decrease in the value of N. As used herein, the signal to noise ratio may be value based on any deviations of actual measurement of the input power waveform with respect to expected values therefor, or it may be an indirect approximation based on e.g. a proportion of data packets which do not correspond to a valid code word.

The value of N may vary in response to a change in the type of data packet being carried by the input power waveform; e.g., the value of N may be dependent on which control command of a plurality of control commands is represented by a first packet of a plurality of incoming data packets. In an embodiment, if the first packet represents a 'critical command' then N may be increased in order to reduce the likelihood that the critical command is implemented at a time when it should not be implemented and/or in a manner in which it should not be implemented. Conversely, in an embodiment N may be set to a minimum value (e.g. N=2) in response to determining that the first packet represents a non-critical command.

As used herein, a control command is data which a controller of the apparatus is configured to interpret and act on in a predetermined manner in order to effect some sort of change in the apparatus. A dimming command is an example of a control command. A power-off command is another example of a control command. A power-on command is another example of a control command. A higher value of N might be associated with a power-off command as compared with a dimming command, for example.

In various embodiments, the method may comprise controlling said at least one aspect of the apparatus based on said N data packets only if said N data packets were received consecutively. In an embodiment, for example, a received control command is not implemented until N data packets representing the control command are received consecutively.

In various embodiments, the method may comprise controlling said at least one aspect of the apparatus based on said N data packets only if said plurality of incoming data packets comprises no more than M data packets. In an embodiment, for example, a received control command is not implemented unless N out of M consecutive data packets represent the control command. For instance, it may be that if M (e.g., 10) consecutive data packets are obtained from the input power waveform, a received control command will be implemented if any N (e.g., 5) or more of those M data packets represent the control command, but not if fewer than N of the ten data packets represent the control command.

The method of claim 1 or claim 2, comprising controlling said at least one aspect of the apparatus based on said N data packets only if said plurality of incoming data packets comprises no more than M data packets.

In various embodiments, the method may comprise controlling said at least one aspect of the apparatus based on said N data packets only if said N data were demodulated within a time interval. In an embodiment, the time interval has a predetermined duration. In an embodiment, the time interval has a duration which is independent of the input power waveform. The time interval may have a duration of at least ten minutes. The time interval may have a duration of less than one minute. In an embodiment, the time interval has a duration which is dependent on a signal-to-noise level of the input power waveform. In an embodiment, the time interval has a duration which is dependent on which control command of a plurality of control commands is represented by a first packet of the plurality of incoming said N data packets.

In various embodiments, said apparatus may comprise a lighting fixture and said N data packets may pertain to a dimming command for the lighting fixture; a dimming level of said lighting fixture may be controlled based on said dimming command.

Various embodiments provide a controller for receiving an input power waveform, the controller being arranged to control an apparatus based on analysis of the input power waveform in accordance with the foregoing methods. Various embodiments provide a lighting fixture comprising said controller, said controller being arranged to control the lighting fixture based on analysis of the input power waveform in accordance with the foregoing methods.

In another aspect of the present disclosure, in various embodiments there is a method of transmitting a data packet to a network via modulation of a power waveform supplied thereto. The method may comprise receiving data for transmitting to one or more apparatus of the network. The method may comprise determining a data packet based on said data. The method may comprise repeatedly modulating the power waveform in accordance with the data packet until said data packet has been transmitted a predetermined number of times, at least twice. Said modulating may comprise, for example, switching a transformer in series with a line of an output voltage to said lighting fixtures during a plurality of cycle periods of said output voltage, wherein said switching causes one of a voltage drop and a voltage rise in said output voltage, and wherein said switching is done in correspondence with said data packet such that said one of said voltage drop and said voltage rise correspond to said data packet. Other suitable modulation schemes may be appreciated by those of ordinary skill in the art.

In various embodiments, the method may further comprise selecting said predetermined number of times in dependence on said data, whereby said data packet is transmitted more times if said data is indicative of a first control command than if said data is indicative of a second control command.

In various embodiments, the method may further comprise selecting said predetermined number of times based on a magnitude of said one of said voltage drop and said voltage rise, whereby said data packet is transmitted more times if said magnitude is below a threshold than if said magnitude is above said threshold.

Various embodiments provide an apparatus comprising a transformer arranged to be connected in series with a line of a power line feeding an power waveform to a network, said transformer comprising a controller in communication with at least one switch of said transformer, said controller being configured to transmit at least one data packet to the network via manipulation of the transformer.

Various embodiments provide a lighting fixture network comprising a plurality of the lighting fixtures described above. The network may further comprise a power line arranged to provide a power waveform to the plurality of lighting fixtures. The network may further comprise the apparatus of the immediately preceding paragraph, connected in series with a line of the power line for transmitting at least one data packet to the plurality of lighting fixtures.

Various embodiments provide computer program products comprising computer interpretable instructions which, when executed by a suitable controller, cause the controller to be configured to perform one of the methods described above.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, various embodiments of the approach disclosed herein are particularly suited for adjusting the dimming level of a street lighting fixture in a street lighting network. Accordingly, for illustrative purposes, the claimed invention is discussed in conjunction with such street lighting network. However, other configurations and applications of this approach are contemplated without deviating from the scope or spirit of the claimed invention. For example, in some applications the approach may be implemented in an indoor lighting environment such as controlling a plurality of indoor lighting fixtures in an office environment.

Figure 1:
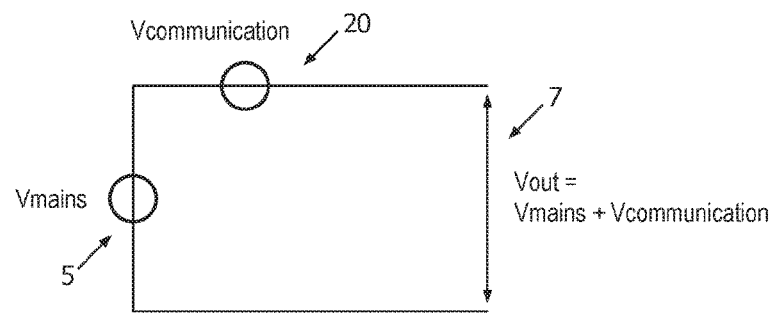
FIG. 1 illustrates a schematic of a communications transformer placed in series with a phase line of a mains power supply.

Referring to FIG. 1, in one embodiment, a communications transformer 20 is placed in series with a line of a mains power supply 5. In some embodiments the line of the mains power supply 5 may be the phase line. The mains power supply 5 may include a mains power supply transformer that is sized to power one or more power connected apparatus, such as lighting fixtures, that are connected to a group output voltage 7. As discussed herein, the communications transformer 20 may be modulated by a controller to thereby modulate the voltage supplied over group output voltage 7 in accord with a data signal. For example, the communications transformer 20 may be modulated during portions of a sine cycle of the voltage supplied by mains power supply 5 to cause a certain voltage drop during such portions of a sine cycle. The voltage drops may correspond to a communications data packet that is to be sent by the communications transformer 20 over the group output voltage 7. The communications transformer 20 only needs to supply the power needed to raise or lower the mains voltage generated by the mains power supply 5. For example, if the communications transformer effectuates a one volt modulation and the mains power supply is two hundred and thirty volts, the power rating of the communications transformer 20 only needs to be $1/230$ of the rating of the mains power supply transformer. Accordingly, in certain embodiments the communications transformer 20 may optionally be of a small size relative to the mains transformer.

Figure 2:
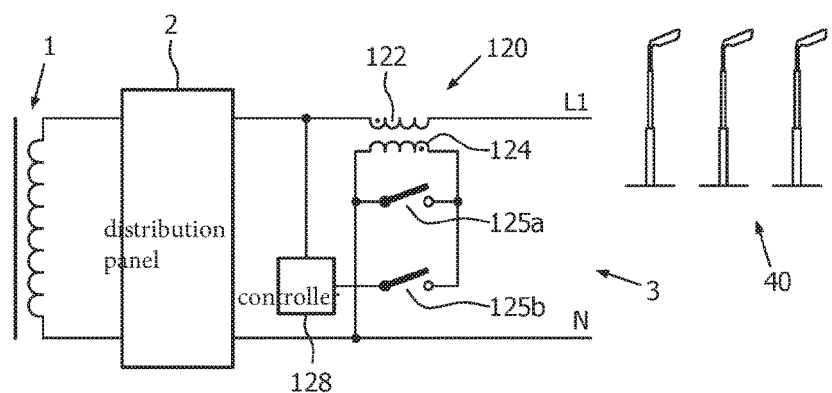
FIG. 2 illustrates a lighting fixture network being fed by a mains supply transformer and including a communications transformer; the communications transformer and the mains supply transformer supply a lighting fixture group output to a group of lighting fixtures.

Referring to FIG. 2, in another embodiment, a communications transformer 120 is illustrated downstream of a mains supply transformer 1 that feeds a distribution panel 2. The mains supply transformer 1 and the distribution panel 2 provide protection, routing, and switching of an output voltage 3 that is supplied over phase line L1 and neutral line N to lighting fixtures 40. The transformer 120 is connected in series with the phase line L1 and includes a primary winding 122 and a secondary winding 124. The secondary winding 124 includes a plurality of electronically actuable switches 125a, 125b that may be selectively activated to alter the state of the transformer 120. When switch 125b is closed and switch 125a is open, the transformer 120 is switched on and a voltage is added to the normal output voltage 3. In some embodiments the added voltage may be approximately one volt. In some embodiments the transformer 120 may additionally or alternatively be configured to decrease the voltage relative to the normal output voltage 3 (e.g., by changing the primary winding to secondary winding ratio, by changing the polarity of the connection of transformer 120). When switch 125a is also closed, the transformer 120 is short circuited and no voltage is added to the normal output voltage 3 and when switch 125b is closed voltage will be added. In some embodiments the switch 125a may be omitted. In such embodiments, when the switch 125b is opened no voltage will be added to the normal output voltage 3. Also, in some of those embodiments where the switch 125a is omitted, the transformer 120 may saturate and form a nonlinear series impedance when the switch 125b is opened.

A controller 128 is also illustrated in FIG. 2 that is electronically coupled to the switches 125a, 125b and that is also electrically coupled to the output voltage 3. The controller 128 selectively activates one or more of the switches 125a, 125b as described herein to encode a communications data packet in the output voltage 3. For example, in order to transmit a binary data packet, the controller 128 may selectively activate the switch 125a during certain half-sine cycles of the input voltage to cause a voltage increase at the lighting fixture group output voltage 3 during those half-sine cycles (thereby representing a binary "high") and not activate the switch 125*a* during other half-sine cycles (thereby representing a binary "low"). Also, for example, in alternative embodiments when activating the transformer causes a voltage drop, in order to transmit a binary data packet, the controller 128 may selectively activate one or more switches during certain half-sine cycles of the input voltage to cause a voltage decrease at the output voltage 3 during those half-sine cycles (thereby representing a binary "low") and not activate the one of the switches during other half-sine cycles (thereby representing a binary "high"). The switch(es) may optionally be activated between immediately successive zero-crossings of the input voltage 1 to thereby provide for voltage alteration during half-sine cycles.

It will be appreciated that for the transformer 120 to be "idle", it should be shorted since an open winding could cause a malfunction resulting from high voltages on the primary side of the transformer 120.

In some embodiments, the transformer 120 may be installed in a feeder pillar or street cabinet associated with a group of street lighting fixtures. In some embodiments the transformer 120 may be small enough to fit on a DIN mounting rail. For example, assuming a 10 kVA string of street lights and a 1 Volt voltage drop/rise on half-sine cycles (or other sine cycle period) to transmit data packets as described herein, the transformer 20 would only need to handle approximately 40 Watts.

In some embodiments, a communications transformer may be provided that includes a primary winding and secondary winding having the same number of turns. One or more taps may be provided, including one or more above normal taps and/or below normal taps, thereby enabling respective of increase and/or decrease in the turn ratio of the windings through electronic switching of the taps and a corresponding increase and/or decrease to the normal output voltage 3 when the communications transformer is activated.

Figure 8:
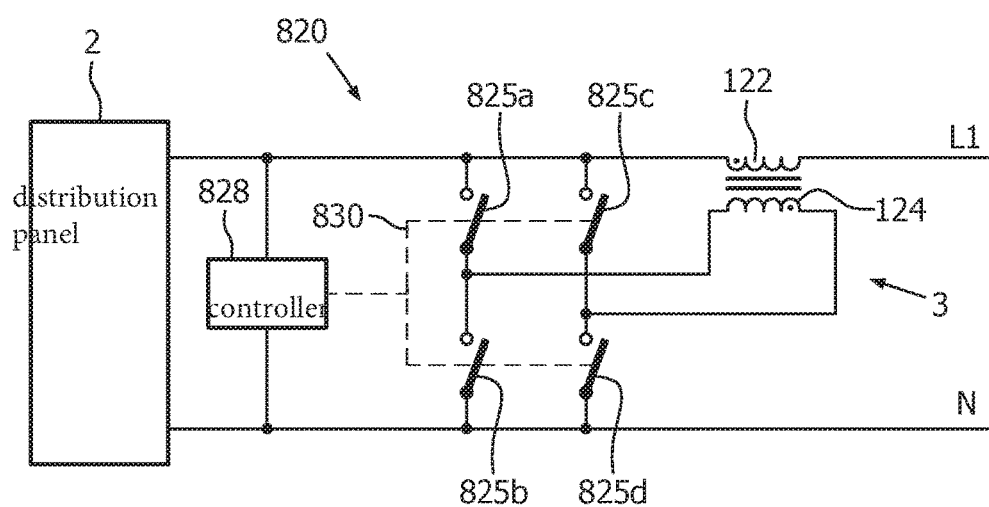
FIG. 8 illustrates an alternative for the communications transformer included in the mains supply transformer of FIG. 2.

Reference will now be made to FIG. 8, wherein, as compared with FIG. 2, corresponding reference numerals indicate corresponding parts. As shown in FIG. 8, in another embodiment, a communications transformer 820 is provided downstream of a mains supply transformer (not shown) that feeds a distribution panel 2. The mains supply transformer and the distribution panel 2 provide protection, routing, and switching of an output voltage of the distribution panel 2. The transformer 820 is connected in series with the phase line L1 and includes a primary winding 122 and a secondary winding 124. The secondary winding 124 is connected via a plurality of electronically actuable switches 825*a*, 825*b*, 825*c* and 825*d* to the phase line L1 and the neutral line N. More specifically, one end of the secondary winding 124 is connected via a first one of the actuable switches 825*a* to the phase line L1 and is connected via a second one of the actuable switches 825*a* to the neutral line N. The other end of the secondary winding 124 is connected via a third one of the actuable switches 825*c* to the phase line L1 and is connected via a fourth one of the actuable switches 825*d* to the neutral line N.

The plurality of electronically actuable switches 825*a*, 825*b*, 825*c* and 825*d* may be selectively activated to alter the state of the transformer 120. Consequently the secondary winding 124 can be switched in-phase and out-of-phase with the mains voltage, for increasing or decreasing the output voltage 3.

As shown in FIG. 2, a controller 828 is electronically coupled to the plurality of electronically actuable switches 825*a*, 825*b*, 825*c* and 825*d* via a control connection 830. The controller 828 is configured to selectively activate one or more of the plurality of electronically actuable switches 825*a*, 825*b*, 825*c* and 825*d*, in order to encode a communications data packet in the output voltage 3. For example, in order to transmit a binary data packet, the controller 828 may selectively activate (i.e. "close") one or more of the actuable switches 825*a*, 825*b*, 825*c* and 825*d* during certain half-sine cycles of the input voltage to cause a voltage increase at the output voltage 3 during those half-sine cycles (thereby representing a binary "high") and not activate (i.e. "open", or leave "open") one or more of the actuable switches 825*a*, 825*b*, 825*c* and 825*d* during other half-sine cycles (thereby representing a binary "low"), in a manner that will be readily appreciated by those skilled in the art. Also, for example, in embodiments where activating the transformer 821 causes a voltage drop, in order to transmit a binary data packet, the controller 828 may selectively activate (i.e. "close") one or more of the actuable switches 825*a*, 825*b*, 825*c* and 825*d* during certain half-sine cycles of the input voltage to cause a voltage decrease at the output voltage 3 during those half-sine cycles (thereby representing a binary "low") and not activate (i.e. "open", or leave "open") one or more of the actuable switches 825*a*, 825*b*, 825*c* and 825*d* during other half-sine cycles (thereby representing a binary "high"), in a manner that will be readily appreciated by those skilled in the art. In some embodiments, one or more of the actuable switches 825*a*, 825*b*, 825*c* and 825*d* may be activated between immediately successive zero-crossings of the input voltage to thereby provide for voltage alteration during half-sine cycles.

It will be appreciated that for the transformer 820 to be "idle", it should be shorted since an open winding could cause a malfunction resulting from high voltages on the primary side 122 of the transformer 820.

In some embodiments, the transformer 820 may be installed in a feeder pillar or street cabinet associated with a group of street lighting fixtures. In some embodiments the transformer 820 may be small enough to fit on a DIN mounting rail. For example, assuming a 10 kVA string of street lights and a 1 Volt voltage drop/rise on half-sine cycles (or other sine cycle period) to transmit data packets as described herein, the transformer 820 would only need to handle approximately 40 Watts.

In some embodiments, the communications transformer 820 may be provided that includes a primary winding and a secondary winding which have the same number of turns. One or more taps may be provided, including one or more above normal taps and/or below normal taps, thereby enabling respective increases and/or decreases in the turn ratio of the windings through electronic switching of the taps and a corresponding increase and/or decrease to the normal output voltage 3 when the communications transformer is activated.

Figure 3:
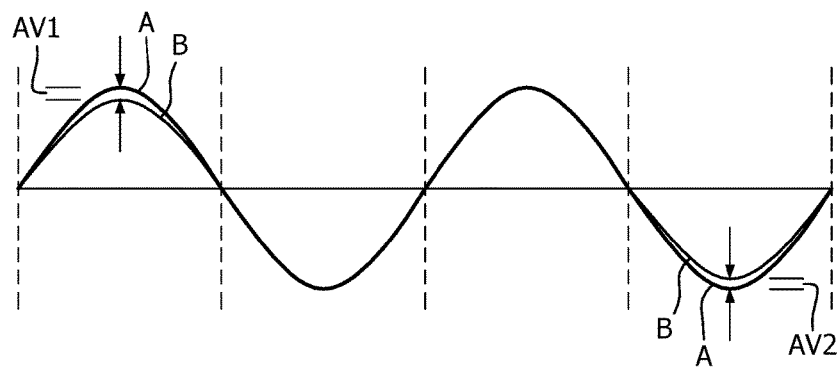
FIG. 3 illustrates a first and second sinusoidal voltage waveform over a portion of the cycles thereof.

Turning to FIG. 3, a first sinusoidal waveform A and a second sinusoidal waveform B are illustrated over two full sine cycles thereof. Sinusoidal waveform A is representative of an output voltage 3 that does not include any encoded data packets and that maintains a substantially constant voltage. Sinusoidal waveform B is representative of a waveform that includes encoded data packets and voltage drops in half-sine cycles thereof. Between the first two zero-crossings of the waveform B (denoted by vertical dashed lines), a voltage drop ΔV1 occurs relative to the waveform A. In some embodiments the voltage drop ΔV1 may be approximately one volt and may be caused via switching of a single switch. In other embodiments other voltage drops may occur and may optionally utilize more than one switch (e.g., may utilize multiple taps associated with one or both windings of the transformer). Between the second and third zero-crossings and the third and fourth zero-crossings, no voltage drop occurs, as can be seen by the waveform A and waveform B substantially mirroring one another. Between the fourth and fifth zero-crossings, a voltage drop ΔV2 occurs relative to the waveform A. In some embodiments the voltage drop ΔV2 may be approximately one volt and may be caused via switching of a single switch of the transformer. Thus, the transmitted waveform B includes a "low" half-sine cycle, followed by two "high" half-sine cycles, then another "low" half-sine cycle. Additional encoded half-sine cycles may continue to be transmitted as desired.

Figures 5, 6:
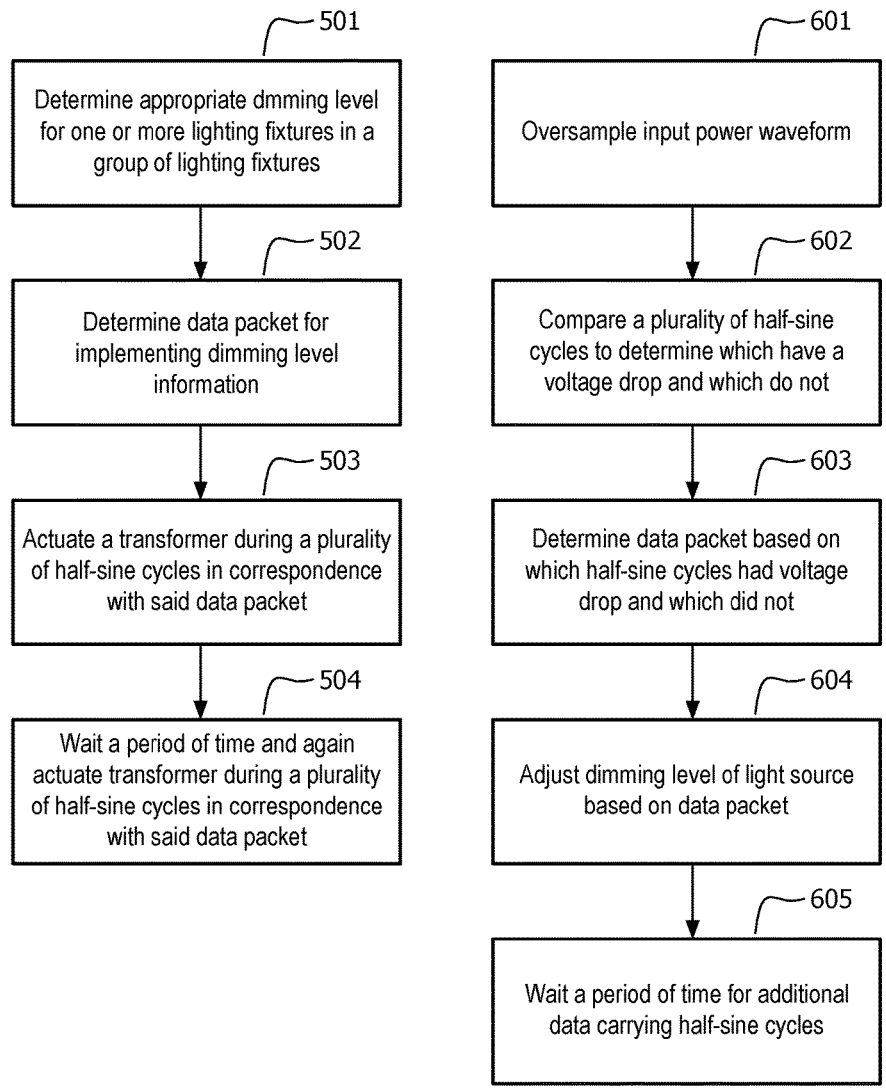
FIG. 5 illustrates an embodiment of determining a data packet and transmitting the data packet via manipulation of a transformer.
FIG. 6 illustrates an embodiment of analyzing an input power waveform and determining data packet information based on the analysis of the input power waveform.

Turning to FIG. 5, an embodiment of a method of determining a data packet and transmitting the data packet via manipulation of a communications transformer is illustrated. The method of FIG. 5 may optionally be performed by controller 128. The method includes the step 501 of determining an appropriate dimming level for one or more lighting fixtures in a group of lighting fixtures. For example, in some embodiments a dimming level for a group of lighting fixtures may be retrieved from a schedule stored in a memory associated with the controller 128. Also, for example, in some embodiments a dimming level may be determined, in whole or in part, via input from one or more sensors such as photo sensors (detecting e.g., ambient light level), proximity sensors (detecting e.g., presence of cars or pedestrians), and/or RF sensors (detecting e.g., signals sent from adjacent lighting fixture networks, signals from a central control system, and/or signals from a vehicle). Although the method of FIG. 5 discusses a dimming level, one of skill in the art, having had the benefit of the present disclosure, will recognize and appreciate that in alternative embodiments additional or alternative aspects of a lighting fixture may be controlled. For example, in some embodiments color output of a LED-based light source of the lighting fixture may be controlled and/or which of a plurality of light sources of a lighting fixture are activated may be controlled. Control information may be directed to one or more addressable lighting fixtures by encoding address data therein and/or may be directed to all lighting fixtures in a group.

At step 502, a data packet for implementing the dimming level information is determined. For example, if the desired dimming level is a medium dimming level, that dimming level information is incorporated into a data packet including a plurality of bits. For example, in some embodiments encoding methods for the data packet may be utilized where data frames with X bits are mapped to transmit frames with Y bits, where Y is greater than X. Such encoding methods may add redundant bits to the data packet by mapping the data packet to codes which all have only short sequences of 0's and 1's. Such encoding methods may provide one or more benefits. For example, such encoding methods may enable low frequency avoidance by only using transmit frames with short sequences of 0's and 1's. Also, for example, such encoding methods may enable error detection by identifying when a transmit code that is not being used is received since there are more transmit frame codes (2Y) compared to the number of data frames (2X). Also, for example, such encoding methods may enable transient error correction by selecting the closest matching transmit code to correct a bit error. Also, for example, such encoding methods may enable burst error recovery by enabling identification of an amplitude change on the mains voltage when multiple (e.g., three or more) consecutive bits at the receiver side are interpreted as 0's or 1's. The receiver may, in response to interpreting multiple consecutive bits as 0's or 1's, adjust time constants of the apparatus utilized to detect voltage averages to speed recovery from such a burst error situation. Also, for example, such encoding methods may enable synchronization by checking the error count on all M possible alignments of the incoming data and identifying the alignment with the lowest error count as the correct alignment.

As an example of an encoding method that may be utilized, 6 redundant bits could be added to 4 data bits to produce a set of 10-bit codes. The 16 possible values of 4 bits of data could be mapped to the set of 10-bit codes using the encoding scheme shown below.

| | |
|---|---|
| 0 → 155 | (0010011011) |
| 1 → 173 | (0010101101) |
| 2 → 182 | (0010110110) |
| 3 → 213 | (0011010101) |
| 4 → 299 | (0100101011) |
| 5 → 309 | (0100110101) |
| 6 → 333 | (0101001101) |
| 7 → 339 | (0101010011) |
| 8 → 358 | (0101100110) |
| 9 → 587 | (1001001011) |
| 10 → 598 | (1001010110) |
| 11 → 613 | (1001100101) |
| 12 → 682 | (1010101010) |
| 13 → 716 | (1011001100) |
| 14 → 813 | (1100101100) |
| 15 → 818 | (1100110010) |

In the example, no 10-bit code contains more than two consecutive 0's or 1's. Accordingly, a data packet transmitting such a code should not cause undesirable disturbances in the power supply to connected devices/apparatus. The 10-bit codes are also sufficiently different from one another to provide for correction of 1 bit by selecting the closest matching transmission code.

The 10-bit codes also provide for synchronization. Any two consecutively transmitted 10-bit codes will be decoded without errors ONLY if the decoder is correctly synchronized. For example, if a controller of a lighting fixture tries to decode 10 bits from a received series of bits, but the ten bits under consideration comprise the last 5 bits from one 10-bit code and the first 5 bits from the next 10-bit code, the controller should detect an error because those bits will not correspond to one of the 10-bit codes in the set. In such a case the controller may keep 'moving' along the received series of bits, one bit at a time, until the ten bits under consideration are found to correspond to one of the 10-bit codes in the set. The controller should then be synchronized to the received bit stream. At step 503, the transformer 120 is switched on during a plurality of half-sine cycles in correspondence with the data packet. In some embodiments the transformer may be switched via actuation of one or more switches 125a, 125b. For example, in some embodiments one or more of the switches 125a, 125b may be actuated during half-sine cycles that are to correspond with a data high and may not be actuated during half-sine cycles that are to correspond with a data low.

Optionally, the data packet may be encoded on a plurality of continuous half-sine cycles. In other embodiments one or more non-encoded half-sine cycles may be interposed within the data packet.

In some embodiments the data packet may be encoded only on either a plurality of positive half cycles or a plurality of negative half cycles. For example, in some embodiments one of the switches 125a may be actuated during positive half-sine cycles that are to correspond with a data high and may not be actuated during positive half-sine cycles that are to correspond with a data low. In such embodiments the switches will not be actuated in accordance with the data packet during negative half-sine cycles. In such embodiments the negative half-sine cycles may not carry any data or may instead carry a separate data packet. For example, in some embodiments the data packet may be encoded only on the positive half-sine cycles and a second data packet may be encoded only on the negative half-sine cycles.

The negative half-sine cycles and the positive half-sine cycles may be seen as two completely independent communication channels. Synchronization, packet decoding, redundancy coding and command coding (timing and/or state of the channel), and/or data payload may be handled separately between the independent communication channels. Also, the two independent communication channels may optionally be in two different states. For example, the positive half cycle channel may be synchronized and utilized for decoding and executing commands, while the negative channel is in a state where it is not yet utilized for identifying false and true amplitude levels. In some embodiments encoding a data packet on only one of a plurality of positive half cycles or a plurality of negative half cycles may make the data communication more robust to noise caused by an asymmetric load. For instance, a DC load that utilizes a diode to reduce power may only carry current in one of the positive or negative half cycles (dependent on diode polarization), which may cause asymmetric amplitude variation when the DC load is in a reduced power state. If such a load reduces the positive half cycles by 5 volts (via resistive loss) and the negative half cycles by 0 volts, then a data packet sent on both the positive half cycles and the negative half cycles that utilizes a voltage drop of 2 volts to transmit data will be corrupted by such asymmetric amplitude variation. If, however, the data packet is sent only on the positive half cycles or only on the negative half cycles and utilizes a voltage drop of 2 volts, the data packet will not be corrupted.

At step 504, the output voltage may be transmitted un-encoded for a period of time and the transformer 120 may then again be switched during a plurality of half-sine cycles in correspondence with the data packet. The data packet may be continuously transmitted (optionally after a period of time) in certain embodiments where lighting fixtures will revert back to a previous or default state unless data packets are retransmitted. For example, in some embodiments the dimming level will be transmitted approximately every five minutes. If a lighting fixture does not receive a renewed dimming level instruction within six minutes of the most recent dimming level instruction, then that lighting fixture may revert back to a previous or default state (e.g., utilizing a preloaded schedule) until another dimming level instruction is received.

In some embodiments a same data packet may be transmitted two or more times in succession in order to provide a degree of robustness against error. The number of times a given data packet is transmitted in succession may correspond to the type of data packet; for example, in order to increase the likelihood that a 'high priority' data packet is decoded correctly at a receiving lighting fixture, the 'high priority' data packet may be transmitted more times than a 'lower priority' data packet would be transmitted.

The controller 128 may be configured to transmit a given data packet two or more times in succession, for the reasons noted above, for example by implementing the following algorithm.

procedure transmit successive data packets
retrieve from memory a switch actuation waveform corresponding to the data packet;
retrieve from memory a repetition value corresponding to the data packet;
set M to the repetition value;
for j:=1 to M do
actuate one or more of the switches 125a, 125b in accordance with the switch actuation waveform.

Some embodiments may omit the "retrieve from memory . . . " and "set M to the repetition value" steps of the above algorithm, so that the data packet is transmitted a predetermined number (i.e., M) of times which is independent of the data packet itself.

Figure 4:
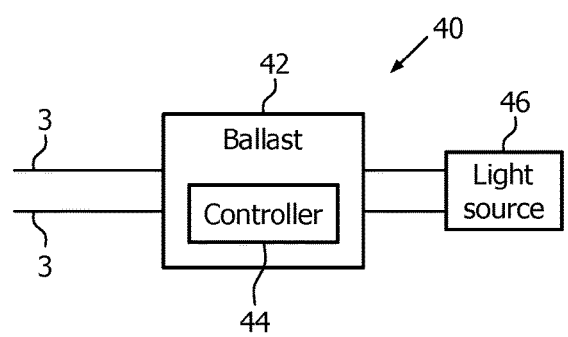
FIG. 4 illustrates an embodiment of a lighting fixture that may be electrically coupled to the group output voltage of FIG. 1 or 2.

FIG. 4 illustrates an embodiment of a lighting fixture 40 that is electrically coupled to the lighting fixture group output voltage 3 of the transformer 120 of FIG. 2. The lighting fixture 40 includes a ballast 42 that receives the lighting fixture group output voltage 3. The ballast 42 includes a controller 44 that monitors the lighting fixture group output voltage 3. In some embodiments an analog to digital converter may be interposed between the controller 44 and the lighting fixture group output voltage 3. The controller 44 may optionally oversample the lighting fixture group output voltage 3 received via the analog to digital converter to achieve an accuracy that is greater than the resolution that can be achieved by the analog to digital converter alone. The controller 44 may then compare half-sine cycles to detect which half-sine cycles were affected by a voltage drop or voltage rise and which ones were not. For example, if waveform B of FIG. 3 were transmitted across the lighting fixture group output voltage 3, the controller 44 could determine that a "low" half-sine cycle, followed by two "high" half-sine cycles, then another "low" half-sine cycle were present at the lighting fixture group output voltage 3. The controller 44 may control one or more aspects of the lighting fixture 40 based on received encoded power from lighting fixture group output voltage 3. For example, if dimming level encoded data is received, the controller 44 may cause ballast 42 to operate the light source 46 at the transmitted dimming level.

In some embodiments, the controller 44 and analog to digital converter may be similar to hardware currently utilized in lamp ballasts (e.g., to measure the lighting fixture group output voltage 3). In some versions of those embodiments updated software may be installed on an existing controller 44. In other versions of those embodiments the controller 44 and/or ballast may be new. Utilization of modified hardware that is similar to hardware currently utilized in lamp drivers may enable easy incorporation of the modified hardware in existing fixtures.

Turning to FIG. 6, an embodiment of a method of analyzing an input power waveform and determining data packet information based on the analysis of the input power waveform. The method of FIG. 6 may optionally be performed by controller 44. The method includes the step 601 of oversampling the input power waveform transmitted via lighting fixture group output voltage 3. As discussed, the input power waveform may optionally first be altered by an analog to digital converter prior to oversampling.

At step 602, a plurality of half-sine cycles are compared to determine which of those cycles have a voltage drop and which do not. For example, in some embodiments each successive half-sine cycle will be analyzed to determine whether it has a voltage drop or no voltage drop. Also, for example, in some embodiments every fourth half-sine cycle will be analyzed to determine whether it has a voltage drop or no voltage drop. In other embodiments a plurality of half-sine cycles are compared to determine which of those cycles have a voltage rise and which do not.

Also, for example, in some embodiments only each positive half-sine cycle will be analyzed to determine whether it has a voltage drop or no voltage drop or only each negative half-sine cycle will be analyzed to determine whether it has a voltage drop or no voltage drop. For example, in some embodiments the data packet may be encoded only on the positive half-sine cycles and only the positive half-sine cycles analyzed to determine the data packet. Also, for example, in some embodiments a first data packet may be encoded only on the positive half-sine cycles and only the positive half-sine cycles analyzed to determine the first data packet. A second data packet may be encoded only on the negative half-sine cycles and only the negative half-sine cycles analyzed to determine the second data packet. The negative half-sine cycles and the positive half-sine cycles may be seen as two completely independent communication channels. Synchronization, packet decoding, redundancy coding and command coding (timing and/or state of the channel), and/or data payload may be handled completely separately between the independent communication channels. Also, the two independent communication channels may optionally be in two completely different states.

In some embodiments a low pass filter and/or other apparatus may be utilized to average the received input power waveform and the average may be utilized in determination of whether a half cycle has a voltage drop or a voltage rise. An unwanted sudden change of amplitude in the AC mains voltage will slowly increase or decrease this average, which may cause a temporary error in the determination of whether a half cycle has a voltage drop or a voltage rise. Such errors would persist until the low pass filter has adjusted to the new normal average value. In some implementations the low pass filter may be adjusted to speed-up adjustment of the normal average value, in response to detecting a sudden change of amplitude in the AC mains voltage. Such a sudden change in amplitude of the AC mains may be identified when multiple sequential bits at the receiver side are interpreted as 0's or 1's when encoding methods have been utilized to map the data packet to codes which all have only short sequences of 0's and 1's. The receiver may, in response to interpreting multiple sequential bits as 0's or 1's, adjust time constants of the apparatus utilized to detect voltage averages to speed recovery from such a burst error.

At step 603, a plurality of incoming data packets are demodulated from the input power waveform. The data packets are determined based on which of the half-sine cycles had a voltage drop and which did not. For example, the voltage drop packets may be interpreted as digital lows and the non-voltage drop packets may be interpreted as digital highs.

Figure 7:
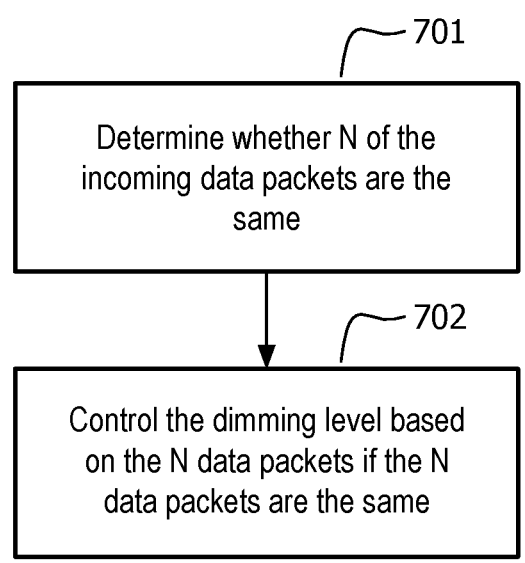
FIG. 7 illustrates in more detail the fourth step shown in FIG. 6.

At step 604, the dimming level of the light source 46 is adjusted based on the data packets if at least N of the data packets are the same, and if necessary. For example, the data packets may each include one or more bits that are indicative of a dimming level. If the dimming level differs from the current dimming level of the light source 46, and is the same as the dimming level indicated by N−1 other ones of the data packets, then the dimming level of the light source 46 may be adjusted via ballast 42. As shown in FIG. 7, step 604 comprises two sub-steps. At step 701, the controller 44 determines whether N of the data packets are the same, e.g. whether each is indicative of the same dimming level. At step 702, the controller 44 controls the dimming level (or some other aspect) of the light source 46 based on said N data packets if said N data packets were determined to be the same at step 701. In other words, the controller 44 may be configured to adjust the dimming level of the light source 46 in response to receiving two or more same data packets in succession; it may be configured not to react to the first such data packet, instead 'waiting for confirmation' in the form of one or more subsequent same data packets. For example, the controller may be configured to implement the following algorithm.

procedure adjust dimming level
    determine a first data packet from the input power waveform;
    store the first data packet in memory;
    set a same-packet counter to 1;
    repeat
    determine a subsequent data packet from the input power waveform;
    retrieve the stored data packet from memory;
    if the subsequent data packet is substantially the same as the stored data packet then increment the same-packet counter;
    store the subsequent data packet in memory in replacement of the retrieved data packet;
    until the same-packet counter=N (where N is at least 2)
    determine a dimming level corresponding to the stored data packet;
    adjust the dimming level of the light source based on the determined dimming level.

The controller 44 may be configured to vary the value of N in response to a variation in one or more properties of the input power waveform. In some embodiments the value of N is dependent on the signal to noise ratio found in the input power waveform. If there is high noise, for example, the value of N will be increased. If there is low noise, N can be very low, even 2. Those of ordinary skill in the art will readily appreciate various suitable and conventional ways of determining the signal to noise ratio in the input power waveform, which need not be set out in detail here. For example, if the sixteen 10-bit code words described above are used as the encoding scheme, the proportion of data packets received during a certain time interval which do not correspond to one the sixteen code words can be used as an indication of the signal to noise ratio in the input power waveform during that time interval. Alternatively (or additionally), if there should be only two peak-to-peak voltage levels then the controller 44 can observe deviations from the two voltage levels across a plurality of measurements in order to estimate the noise level in the input power waveform, and thus the signal to noise ration therein.

At step 605, the controller 44 may optionally wait a period of time for additional data carrying half-sine cycles to be transmitted. For example, the data packet may be continuously transmitted (optionally after a period of time) in certain embodiments and the lighting fixtures will revert back to a previous or default state unless data packets are received within a certain time period. For example, in some embodiments the dimming level will be transmitted approximately every minute. If a lighting fixture does not receive a renewed dimming level instruction within a minute of the most recent dimming level instruction, then controller 44 may cause the ballast 42 to gradually revert to driving the light source 46 at a full output power. Optionally, in some embodiments full output power may be the default when no dim signal is detected via the data packet. In combination with optional cabinet level switching of the mains power during the day, such a solution may be very robust to error situations with data packet transmission. Also, in some alternative embodiments other lighting controls may additionally or alternatively operate the lighting fixture if a lighting fixture does not receive a renewed dimming level instruction within a certain amount of time or otherwise loses proper communication with output from transformer 120. For example, the lighting fixture may by default be controlled in response to, inter alia, an output of a daylight sensor of the lighting fixture.

Although the method of FIG. 6 discusses a dimming level, one of skill in the art, having had the benefit of the present disclosure will recognize and appreciate that in alternative embodiments additional or alternative aspects of a lighting fixture may be controlled. For example, in some embodiments color output of the lighting fixture may be controlled and/or which light sources of a lighting fixture are activated may be controlled.

Although the methods of FIGS. 5 and 6 discuss manipulation of voltage during a plurality of half-sine cycles, one of skill in the art, having had the benefit of the present disclosure will recognize and appreciate that in alternative embodiments additional or alternative periods of a sine cycle may be utilized. For example, in some embodiments manipulation may occur over quarter-sine cycles, three-quarter-sine cycles, and/or more than one sine cycle (e.g. one-and-a-half-sine cycles). For example, in some embodiments manipulation may alternatingly occur over half-sine cycles and three-quarter-sine cycles. Controller 128 may properly be configured to transmit any such alternative sine-cycle periods and controller 44 may be properly configured to receive and analyze any such alternative sine-cycle periods.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses, if any, are provided merely for convenience and should not be construed limiting the claims in any way.

In the claims, as well as in the specification above, all transitional phrases such as "comprising," "including," "carrying," "having," "containing," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A method of controlling an apparatus based on analysis of an input power waveform supplied to the apparatus, comprising:
   demodulating a plurality of incoming data packets from the input power waveform;
   determining whether N data packets of said plurality of incoming data packets are the same, wherein N is a positive integer greater than 1 having a dynamic value that depends on the input power waveform;
   controlling at least one aspect of the apparatus based on said N data packets only after said determining step has determined that said N data packets were the same; and
   wherein the value of N varies in response to a change in a type of data packet being carried by the input power waveform.

2. The method of claim 1, wherein the value of N depends on at least one of:
   a signal-to-noise level of the input power waveform; and
   which control command of a plurality of control commands is represented by a first data packet of the plurality of incoming data packets.

3. The method of claim 1, comprising controlling said at least one aspect of the apparatus based on said N data packets only if said N data packets were received consecutively.

4. The method of claim 1, comprising controlling said at least one aspect of the apparatus based on said N data packets only if said plurality of incoming data packets comprises no more than M data packets.

5. The method of claim 1, comprising controlling said at least one aspect of the apparatus based on said N data packets only if said N data were demodulated within a time interval.

6. The method of claim 5, wherein the time interval has a duration which is dependent on at least one of:
a signal-to-noise level of the input power waveform; and
which control command of a plurality of control commands is represented by a first data packet of the plurality of incoming said N data packets.

7. The method of claim 1, wherein said apparatus comprises a lighting fixture, wherein said N data packets pertain to a dimming command, and wherein a dimming level of said lighting fixture is controlled based on said dimming command.

8. A controller implementing the method of claim 1.

9. A lighting fixture comprising the controller of claim 8.

10. A non-transitory computer readable medium containing computer instructions stored therein which, when executed by a controller cause the controller to be configured to perform the method of claim 1.

11. A method of controlling an apparatus on a network, the method comprising:
transmitting a data packet to the network via modulation of a power waveform supplied thereto, said transmitting step comprising:
receiving data for transmitting to one or more apparatus of the network;
determining a data packet based on said data; and
repeatedly modulating the power waveform in correspondence with said data packet until said data packet has been transmitted a predetermined number of times, at least twice; and
controlling the apparatus in conformance with said data packet, said controlling step comprising:
demodulating a plurality of incoming data packets from the input power waveform;
determining whether N data packets of said plurality of incoming data packets are the same, wherein N is a positive integer greater than 1 having a dynamic value that depends on the input power waveform; and
controlling at least one aspect of the apparatus based on said N data packets only after said determining step has determined that said N data packets were the same, and
wherein the value of N varies in response to a change in a type of data packet being carried by the input power waveform.

12. The method of claim 11, further comprising selecting said predetermined number of times in dependence on said data, whereby said data packet is transmitted more times if said data is indicative of a first control command than if said data is indicative of a second control command.

13. An apparatus comprising a transformer connected in series with a line of a power line feeding power waveform to a network, said transformer comprising a controller in communication with at least one switch of said transformer, said controller implementing the method of claim 11.

14. A lighting fixture network comprising:
a plurality of lighting fixtures according to claim 9;
a power line arranged to provide a power waveform to the plurality of lighting fixtures; and
the apparatus comprising a transformer, the transformer thereof being connected in series with a line of the power line for transmitting at least one data packet to the plurality of lighting fixtures.

15. A non-transitory computer readable medium containing computer instructions stored therein which, when executed by a suitable controller cause the controller to be configured to perform the method of claim 11.

* * * * *